United States Patent [19]

Backes

[11] Patent Number: 5,341,459

[45] Date of Patent: Aug. 23, 1994

[54] GENERALIZED COMPLIANT MOTION PRIMITIVE

[75] Inventor: Paul G. Backes, La Crescenta, Calif.

[73] Assignee: The United States of America as represented by the Administrator of the National Aeronautics and Space Administration, Washington, D.C.

[21] Appl. No.: 744,118

[22] Filed: Aug. 9, 1991

Related U.S. Application Data

[63] Continuation-in-part of Ser. No. 699,299, May 9, 1991, Pat. No. 5,231,693.

[51] Int. Cl.$^5$ .................. G06F 15/00; G05B 19/24
[52] U.S. Cl. ........................... 395/95; 395/96; 395/84; 395/99; 364/424.02
[58] Field of Search ............ 395/94, 99, 84, 95, 395/96; 318/573, 568.1; 364/424.02

[56] References Cited

U.S. PATENT DOCUMENTS

| | | | |
|---|---|---|---|
| 4,166,543 | 9/1979 | Dahlstrom | 395/88 |
| 4,831,531 | 5/1989 | Adams et al. | 395/99 |
| 4,887,222 | 12/1989 | Miyake et al. | 395/86 |
| 4,899,095 | 2/1990 | Kishi et al. | 395/97 |
| 4,916,635 | 4/1990 | Singer et al. | 395/89 |
| 4,920,500 | 4/1990 | Hetland et al. | 395/86 |
| 4,942,538 | 7/1990 | Yuan et al. | 395/94 |
| 5,038,089 | 8/1991 | Szakaly | 318/573 |
| 5,046,022 | 9/1991 | Conway et al. | 395/99 |
| 5,047,700 | 9/1991 | Szakaly | 395/99 |
| 5,086,400 | 2/1992 | Hayati et al. | 395/95 |

OTHER PUBLICATIONS

Paul G. Backes, Generalized Compliant Motion Task Description and Execution Within a Complete Telerobotic System, "1990 IEEE International Conference on Systems Engineering", Aug. 9, 1990, pp. 1–4.

Montemerlo et al, "The Space Perspective" Nato advanced Research Workshop, Jul. 1, 1988.

Bejczy et al "Universal Computer Control System (UCCS) for Space Telerobots" 1987 IEEE.

Sheridan et al, "Telerobotics", 10th IFAC World Congress on Automatic Control, Jul. 1987, Munich, FRG.

Bejczy et al, "A synchronized computational architecture for generalized bilateral control of robot arms" SPIE vol. 851 Space Station Automation III (1987).

Backes et al, "An Interactive Supervisory and Shared Control System for Telerobotics" Proc. of 1990 IEEE Int. Conf. on Robotics & Automation, May 1990.

*Primary Examiner*—Allen R. MacDonald
*Assistant Examiner*—George Davis
*Attorney, Agent, or Firm*—John H. Kusmiss; Thomas H. Jones; Guy M. Miller

[57] ABSTRACT

A generalized compliant motion with sensor fusion primitive uses a set of input parameters provided from a local control site to a remote execution site to control a telerobot with a combination of a priori trajectory motion and real and virtual local and remote sensor inputs. The set of input parameters specify the desired telerobot behavior based on a combination of local and remote information. This general motion primitive requires less computer memory size, and provides more capabilities, than the task specific primitives it replaces because redundancies are eliminated while permutations of capabilities are available. Trajectory motion occurs during a nominal motion time segment while termination conditions are monitored during an ending time segment to stop motion when a termination condition occurs. Force and compliant motion, teleoperation, dither, virtual springs restoration and joint limit control are combined with the trajectory motion at the remote site.

1 Claim, 3 Drawing Sheets

GENERALIZED COMPLIANT MOTION PRIMITIVE

ORIGIN OF THE INVENTION

The invention described herein was made in the performance of work under a NASA contract, and is subject to the provisions of Public Law 96517 (35 USC 202) in which the Contractor has elected not to retain title.

CROSS REFERENCE TO RELATED APPLICATION

This is a continuation-in-part of U.S. patent application Ser. No. 07/699,299, filed May 9, 1991, U.S. Pat. No. 5,231,693.

TECHNICAL FIELD

The present invention relates to robotic control systems and, in particular, to task primitives, that is, preprogrammed programs for controlling a robot to accomplish a task based on a set of input parameters which may be designated before, at the start time of, or during task execution.

BACKGROUND OF THE INVENTION

Techniques for the operation and control of robotic manipulators in some environments, such as manufacturing facilities, have been developed and used successfully for many years. Many such techniques include the creation of new computer programs for each new robotic task.

These techniques must be substantially modified for use in poorly modeled environments, or to perform tasks in response to unplanned scenarios and when there is a potentially substantial time delay between command generation and task execution as occurs for example in surface controlled undersea and ground controlled space robotic operations.

One convention approach would be to develop an interpretive robot language which can then be used to write a program which will execute on the robot to execute a specific task. The program would be sent to the system executive which would execute the program to control the robot. The interpretive language approach may be desirable for use in factory automation and similar tasks where a specialized algorithm may be needed for each task.

One major improvement in this area has been the development of systems, as described for example in U.S. patent application Ser. No. 07/699,299, filed May 9, 1991 by the inventor hereof, in which series of task primitive parameters are transmitted between control and operation locations to provide task execution control by one or more task execution primitives and obviate the need to prepare and transmit new robotic control programs for each new task.

The task execution primitive approach is particularly suited for space telerobotics applications where flight qualifying software is required. In this case, the software for the task execution system which resides in space is fixed and can be completely flight qualified before the missions. Specific applications are then specified by the new set of task execution parameters which are transmitted to the space vehicle to describe the desired robot behavior without the need for new programming.

A task execution primitive may be described as a function which controls a manipulator to perform the task described by its input parameter set. The primitive generates the desired setpoints and performs the desired control. The parameter list is the interface between a higher level task planning system and task execution. The details of the implementation are hidden from the planning system. The planning system only needs to know how to describe the desired behavior of execution by setting the input parameters of the task primitive. The command to execute the task primitive and the input parameter list are received from the planning system by a system execute which starts execution of the primitive and returns periodic execution status reports.

In general, remote control of such robotic operation may be accomplished by teleoperation, autonomous or supervisory control as well as a combination of these approaches which is known as shared control.

Interactive robotic task planning, execution and monitoring can be accomplished with pure teleoperation. In this approach, planning resides within the operator's mind, execution is issued by the operator via hand controllers and monitoring is provided by sensory feedback to the operator. Autonomous task planning, execution, and monitoring is the other extreme to teleoperation. Here, the operator initiates only very high level commands such as "replace the electronics module" and planning, execution, and monitoring is then done autonomously without further operator input.

Teleoperation has proven to be a valuable tool for many tasks especially in unmodeled or poorly modeled environments and for unplanned scenarios. The increasing complexity of the tasks to be performed places an ever increasing burden on the operator. Autonomous control is becoming increasingly valuable as a tool to relieve the operator of many task planning, execution, and monitoring responsibilities in order to allow the operator to concentrate on the more crucial elements of a task.

Supervisory and shared control are recent improvements in telerobot task execution for unplanned scenarios, or for poorly modeled environments. Supervisory control is where the operator selects autonomous control commands and associated parameterization for a task and can stop execution at any time. Shared control is the mixing of inputs from an operator and an autonomous control system during task execution.

A key element needed for planning, execution, and monitoring in a supervisory or shared control system is an operator interface which supports shared and supervisory control features. Supervisory features are required to permit the operator to set up teleoperation, autonomous, and shared control task environment parameters and to provide specific input parameters for autonomous task primitives and teleoperation control.

Supervisory and shared control systems benefit greatly from the use of task primitives, which are reusable, predetermined, self contained, preprogrammed programs for controlling a robot to accomplish various tasks, such control being dependent upon a set of input parameters which may be designated before, at the beginning time or during task execution. Shared features of an operator interface are required in order to provide autonomous setting of some environment and control parameters depending upon task context.

The utility of a particular task primitive depends upon it's flexibility. The utilization of sensors, both real and virtual, enhances task execution capability both by providing alternate approaches for executing the task and by making task execution more robust.

A very simple robotic system might have purely position control of a robot from a trajectory generator. Adding a hand controller allows the operator to perform position teleoperation. A force-torque sensor makes force/compliance control possible and therefore robust contact tasks. A virtual force field sensor can aid the operator during teleoperation to keep the robot away from joint limits and objects. Individual task primitives may be provided in the remote robot system for each required task, but the limited size of such remote robot systems, in terms of computer memory limitations and/or number of line of programming code that may be incorporated therein, limits the number of such specialized task primitives which may be used.

It is often difficult to include multiple sensors in a robot control system due to the added system complexity, the difficulty in programming the robot to utilize the sensor, and the difficulty in specifying the task to utilize the sensor. What are needed are task execution primitives which simplify task description and execution when utilizing multiple sensory inputs in addition to trajectory information, especially task execution primitives for the planning, execution and monitoring of telerobot tasks in poorly modeled environments and for unplanned scenarios. Such task execution primitives should efficiently and conveniently permit the combination of teleoperation, autonomous, supervisory, and shared control techniques.

BRIEF STATEMENT OF THE INVENTION

The preceding and other shortcomings of the prior art are addressed and overcome by the present invention that provides, in a first aspect, a method of operating a telerobot by providing a set of input parameters from a local control site to a remote execution site including a telerobot, providing a general motion primitive at the remote site for controlling the telerobot in response to the set of input parameters and to remote and local sensor data, generating trajectory motion input at the remote site with the general motion primitive in response to input parameters specifying desired telerobot trajectory behavior, generating remote sensor motion input at the remote site with the general motion primitive in response to a combination of input parameters specifying desired telerobot behavior based on remote site sensor information and sensor data originating at the remote site, generating local sensor motion input at the remote site with the general motion primitive in response to a combination of input parameters specifying desired telerobot behavior based on local site sensor information and sensor data originating at the local site and simultaneously combining the trajectory, remote sensor and local sensor motion inputs at the remote site to control the motion of the telerobot.

The generalized motion primitive of the present invention provides a maximum of parameterized motion capabilities with a minimum size remote robot system. The input parameter set specifies the desired behavior of each motion module or subsystem as well as the desired monitoring. The generalized Motion primitive replaces the multiple task specific primitives which each have a more limited capability.

The generalized motion primitive eliminates the redundancy inherent in the set of task specific primitives it replaces and provides capabilities not available in the set of task specific primitives. The reason for the greater capability is that the general motion primitive provides the capabilities of the individual primitives it replaces as well as permutations of those abilities resulting from the combination of the non-redundant portions of the complete set of such task specific primitives.

These and other features and advantages of this invention will become further apparent from the detailed description that follows which is accompanied by a set of drawing figure(s). In the figures and description, numerals indicate the various features of the invention, like numerals referring to like features throughout both the drawings and the description.

BRIEF DESCRIPTION OF THE DRAWING(S)

DETAILED DESCRIPTION OF THE INVENTION

A complete telerobot control system utilizing task execution primitives will first be described and then the details of the specific task execution primitive of the present invention will be described in greater detail.

Figure 1:
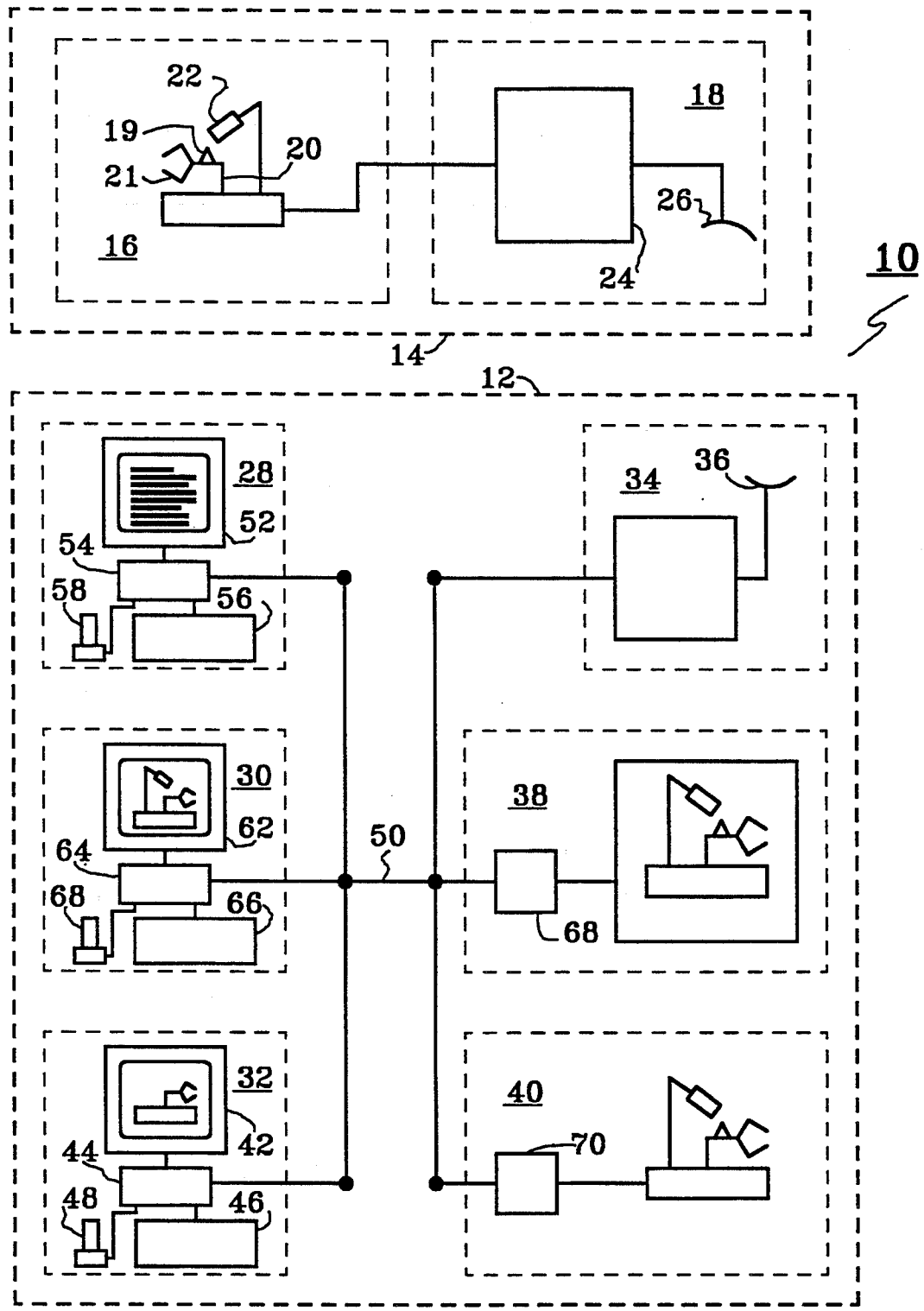
FIG. 1 is a block diagram schematic of a telerobot control system utilizing a task execution primitive according to the present invention.

Referring now to FIG. 1, telerobot control system 10 includes operator interface 12 and remote task execution system 14 which includes robot manipulator 16, suitable for the tasks to be performed, and communication link 18 for providing bidirectional communication with operator interface 12. Robot manipulator 16 includes one or more remotely controllable devices such as robot arm 20, end effector 21 and remote sensors, such as force-torque sensor 19 and video camera 22. Communication link 18 includes communication and control system processor 24 as well as a suitable linkage device, such as antenna 26.

Operator interface 12 includes one or more separate or combined operator terminals, including setup, simulation and execution terminals 28, 30, and 32. Operator interface 12 also includes operator interface communication processor 34, including a suitable linkage device such as antenna 36, as well as graphics simulator 38 and local robot manipulator 40 which are described in greater detail in copending U.S. patent application Ser. No. 07/699,299, filed May 9, 1991, referenced above.

Each operator terminal, such as execution terminal 32, includes monitor central processor 44, a keyboard, mouse or other data entry device such as terminal entry device 46, and a hand control and feedback device, such as hand controller 48. During the various operations performed at the operator terminals, the operator enters information into the appropriate terminal via terminal entry device 46 and/or hand controller 48 and receives information from remote task execution system 14, graphics simulator 38, and/or local robot manipulator 40 via monitor 42 and/or hand controller 48, as appropriate to the task.

All the devices in operator interface are interconnected by a conventional interconnection system, designated generally as interconnection system 50.

Telerobot control system 10 is operable in a conventional telerobot control mode in which pure teleoperation control is employed. During such operation, an operator working at execution terminal 32 is directly connected in real time, or near real time, to remote task execution system 14 via operator interface communication processor 34. Commands entered via terminal entry device 46 and/or hand controller 48 are implemented by robot manipulator 16 while information is made available to the operator from remote sensors, such as force-torque sensor 19 and/or video camera 22, via monitor 42 and/or hand controller 48.

Telerobot control system 10 is operable in a conventional autonomous mode in which autonomous control is employed. During such control, the operator applies an input to execution terminal 32 to cause the execution of a preprogrammed task by robot manipulator 16. The input is applied by interconnection system 50 and operator interface communication processor 34 to communication link 18 which initiates the execution of the preprogrammed task within communication and control system processor 24 by robot manipulator 16. Some information relating to the status of the task and robot manipulator 16 may be collected by sensors, such as video camera 22, and communication and control system processor 24 and be provided to the operator by monitor 42.

Telerobot control system 10 is operable in a conventional supervisory mode in which autonomous task execution is initiated by the operator by the provision of the appropriate parameters to communication and control system processor 24 via terminal entry device 46 and/or hand controller 48. The preprogrammed task within communication and control system processor 24 initiated in this mode is in the form of a task execution primitive, in accordance with the present invention, which requires the provision of a set of input parameters. These parameters may be modified during execution.

Remote task execution system 14, in addition to a set of task primitives, includes an executive program similar to executives within graphics simulator 38 and local robot manipulator 40. These executives control one or more central processing units, or CPU's, within remote task execution system 14 and/or operator interface 12, which sequentially call, operate and execute task primitives, provide status and sensor feedback to operator interface 12 and run other programs, in sequence or in parallel with the task primitives, such as embedded safety and monitoring programs. The executive also maintains and uses a database of global parameters which are normally changed less frequently than the parameters provided to a task primitive would be changed.

The use of a set of task primitives common to operator interface 12 and remote task execution system 14 permits the interactive development and control of the operation of tasks by robot manipulator 16 by passing only parameters and teleoperation inputs between operator interface 12 and remote task execution system 14. Control of remote task execution system 14 by parameterization which may be developed and tested at a local site before being applied to remote task execution system 14 permits a relative wide range of operation of robot manipulator 16 without the transmission of new programming from the local to the remote site. The sequence of parameterized task primitives may be sequenced or stepped through using the executive in operator interface 12 or in remote task execution system 14.

Telerobot control system 10 is operable in a shared control mode in which teleoperated inputs are merged during task execution with inputs from autonomous task primitives. Execution of shared control is initiated by the operator by provision of the appropriate parameters to communication and control system processor 24 via terminal entry device 46 and/or hand controller 48. The preprogrammed task primitive within communication and control system processor 24 is then provided with additional inputs from the operator during execution of the task.

Task primitives under supervisory and/or shared control may be selected in a predetermined sequence to create more complex tasks. For example, a guarded motion primitive may conveniently be followed by a compliant motion primitive, according to the present invention, controlling the grasp of end effector 21 mounted on robot arm 20 to create a more complex task.

A compliant motion primitive for controlling the grasp of end effector 21 could then be used to adjust the position of end effector 21 to control the contact forces while closing the end effector gripper fingers. Sensory feedback provides information concerning the contact forces and torques while parameterization of the compliant motion task primitive sets the control parameters.

Supervisory control to move robot manipulator 16 requires selection of individual task primitives, their sequencing, and parameterization of each such task. Shared control while executing a group of tasks permits the addition of further teleoperation input by the operator during execution of the task.

Shared control with task primitive sequencing permits the execution of complex tasks in response to unplanned scenarios and/or in poorly modeled environments, based on combinations of teleoperation with a group of preprogrammed, generalized task primitives, such as guarded and compliant motion. A generalized compliant motion with sensory fusion primitive in accordance with the present invention is described below in greater detail with regard to FIG. 2 and FIG. 3.

Development of a complex task from the sequencing of a series of less complex task primitives may be accomplished in telerobot control system 10 interactively, using either teleoperation and/or editing, to provide appropriate parameterization. Feedback of the operation of local robot manipulator 40 in response to the developed task may be provided by the appropriate sensors, similar to force-torque sensor 19 and associated with local robot manipulator 40 and/or setup terminal 28.

A substantial benefit of the flexibility of further development provided by telerobot control system 10 is that a relatively fixed set of preprogrammed task primitives, fully tested and qualified for use with remote task execution system 14, can later be utilized as necessary by altering the parameterization of the task primitives to meet the robot control requirements of a new poorly modeled environment and/or unplanned scenarios. The developments of such new instantiations of the preprogrammed task primitives, that is, task primitives with new parameterizations, can be performed without risk or unreasonable burden of prior training on the part of the operator.

Remote task execution system 14 includes communication and control system processor 24 to control robot manipulator 16 and provide a family of task execution primitives as well as an executive program resident therein. In space operations, for example, it is very important that the set of primitives in the remote location, such as a space vehicle, have been fully tested and are capable of being combined to perform all the tasks, planned or unplanned.

While the particular family of task primitives may vary depending upon the application intended for each particular system, a family of such primitives will be described generally in order to facilitate an understanding of the present invention. In addition to the family of task primitives and executive task sequencing, remote task execution system 14 provides periodic task status, sensor data and other feedback information as well as command result information to operator interface 12 via communication link 18 and operator interface communication processor 34.

As described above, the task primitives may include guarded and compliant motion primitives. In accordance with the present invention, a generalized-compliant-motion or GCM primitive is provided for performing compliant motion tasks in Cartesian space. The required inputs include the selection of the robot actuator, the coordinate frame to be used for the destination, the frame to be used for interpolated motion, the frame to be used for control, selection of time or velocity based motion, selection of time or velocity for positional motion, position-force selection vector to select position and force degrees of freedom (DOF's) in the control frame, compliance selection vector to select which position DOF's also have compliance, force-compliance control gains, gains for virtual springs, force-torque and position-orientation thresholds, and ending conditions including a selection integer selecting which ending conditions to test for, such as maximum errors in position, orientation, force and torque and their rates of change.

The compliant grasp primitive closes the gripper fingers of end effector 21 while performing force control to control contact forces. Inputs include which robot actuator to be selected, gripper type such as pneumatic or servoed, selection of frame in which to do force control, force control gains and force control setpoints, and force-torque and position-orientation thresholds. A similar primitive is the free grasp primitive which simply opens or closes the gripper portion of end effector 21.

Telerobot control system 10 provides a hierarchical menu system to guide the operator during description or development of a task from general motion types at the top of the hierarchy to specific motion types at the bottom of the hierarchy. The result is the specification of the task primitives and their parameterization to perform the tasks desired by the operator. The operator need not know the specific task primitives to be used. Instead, the operator specifies a generic motion type, e.g. guarded motion, move to contact, compliant motion, force reflecting teleoperation, or grasp. A new menu then is provided with interaction germane to the specific motion type.

For example, if the operator specifies compliant motion, the compliant motion menu may present hinge, slide, screw, insert, level, push, translation, and similar options. The operator's selection of one of these options invokes a new menu with input selections pertaining only to that type of motion. The insert menu permits the operator to select the insertion direction, et cetera. The interactive hierarchical approach substantially reduces the number of decisions to be made by the operator at any one point in time while still permitting the development of a relatively complex, specific task.

Shared control is where teleoperation inputs from hand controller 48 are merged in communication and control system processor 24 during execution with the autonomous control provided by communication and control system processor 24 to control robot manipulator 16. At the same time, sensor data feedback from robot manipulator 16 can be provided to the operator via execution terminal 32 and/or hand controller 48.

Telerobot control system 10 was configured for operation with various time delays between teleoperation and command inputs and task execution as would be encountered in certain environments, such as those encountered in space and undersea projects. The actual time delays encountered are, of course, the result of the actual delays present between remote task execution system 14 and operator interface 12 which may change at unknown rates. To provide enhanced abilities to develop and simulate the operation of complex tasks in such environments, controllable variable delays, such as time delays 68 and 70, are provided in graphics simulator 38 and/or local robot manipulator 40, respectively.

The generalized compliant motion with sensor fusion primitive, or GCMSF primitive, according to the present invention, will next be described with reference to FIG. 2 and FIG. 3.

The GCMSF primitive of the present invention has a rich input parameter set to provide for the execution of a wide variety of specific tasks and conditions. The rich environment of the GCMSF primitive provides for the execution of tasks such as door opening, crank turning, bolt seating and turning, pushing, sliding, pin insertion and removal, and leveling.

The GCMSF primitive of the present invention provides six sources of robot motion which can be used individually or simultaneously. These sources of motion have two basic types: nominal motion trajectory generation and sensor based motion. Trajectory generation provides the setpoints for the motion. Sensor based motion perturbs the nominal motion based on sensor feedback. Additionally, monitoring checks that the execution is proceeding safely and stops the motion if an anomalous condition is detected.

Two motion time segments are used. The nominal motion time segment includes the position trajectory generation. After the nominal motion is complete, the ending motion time segment begins and continues for a specified time or until specified ending conditions are satisfied.

The input parameters include system, trajectory, fusion, sensor, and monitor parameter types. System parameters describe the complete primitive, trajectory parameters describe the desired setpoint generation, fusion parameters describe how to fuse the various motion sources. Sensor parameters describe sensor data analysis and control and monitor parameters describe how to monitor task execution.

The present invention uses a split rate force-torque control technique using force and torque data read from a 6-axis force-torque sensor. Gravity compensation using input load mass properties is used to determine contact forces. Cartesian space motion and force control is used.

Figure 2:
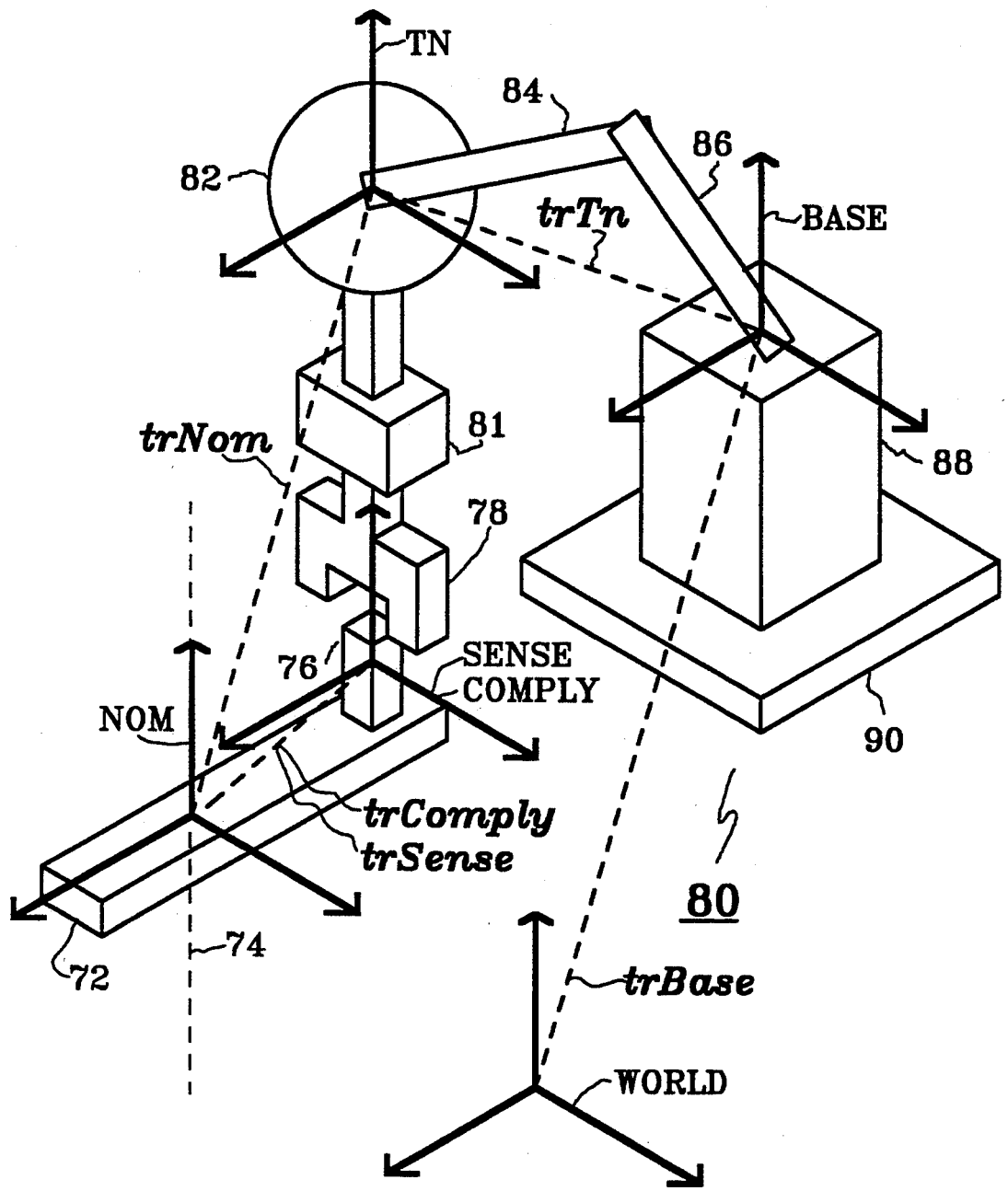
FIG. 2 is an illustration of an example of a task to be performed in accordance with a general motion primitive according to the present invention.

Referring now in particular to FIG. 2, an example of end effector 21 will be described together with the object to be manipulated in an exemplary task in order to specify various coordinate frames used in the description of the GCMSF primitive. The task to be used in this example is the task of rotating crank 72 about axis 74. Crank 72 includes knob 76 suitable for grasping for rotation by the terminal link, such as grip tool 78, of robot arm 80.

Robot arm 80 is illustrated in a functional form in FIG. 2 and includes wrist joints 82, links 84 and 86, and fixed first link or base 88 all supported by support 90 for positioning a terminal link such as grip tool 78. The primary Cartesian coordinate frame is shown as the WORLD coordinate frame. The coordinate frame of the point of connection between link 86 and base 88 is the BASE coordinate frame, while the coordinate frame of wrist joint 82, the terminal link of arm 80, is shown as the TN coordinate frame. The coordinate frame of the work piece, that is, crank 72, is shown as the NOM coordinate frame. Axis 74 is along the vertical axis of the NOM coordinate frame.

The following parameters are included in the rich input parameter set.

System parameters include trBase which provides the transformation from the WORLD coordinate frame to the BASE coordinate frame of robot arm 80; massProp which provides the mass properties of the task dependent load beyond force-torque sensor el; and period which indicates the desired reporting period for status reports to be provided to the executive program.

There are five trajectory parameters. The trajectory parameter trTnDest is the transform from the WORLD coordinate frame to the destination TN coordinate frame. The trajectory parameter trNom is the transform from the TN coordinate frame to the NOM coordinate frame. The trajectory parameter timeVelSel selects time or velocity based motion. The trajectory parameter timeVelVal is the value of the time or velocity to execute nominal motion and the trajectory parameter accTime is the time to ramp up to maximum velocity.

Input parameters related to sensor fusion include the sensor fusion control parameter maxSfVel which is the maximum velocity in the NOM coordinate frame due to the sum of all sensor based control and the sensor fusion monitor parameters transThreshold, which is the maximum translation motion of the NOM coordinate frame due to sensor input, and angThreshold which is the maximum angular motion of the NOM coordinate frame due to sensor input.

There are many termination condition parameters in the input parameter set. The parameter select provides bit mask selecting for the termination conditions to be tested for. testTime sets the time over which to average termination conditions. endTime is the maximum time to test termination conditions after nominal motion.

endTransErr is the minimum translation error in the NOM coordinate frame. endAngErr is the minimum orientation error in the NOM coordinate frame. endTransVel is the minimum time derivative of endTransErr while endAngVel is the minimum time derivative of endAngErr.

endForceErr is the minimum SENSE frame force error vector magnitude and endTorqueErr is the minimum SENSE frame torque error vector magnitude. endForceVel is the minimum time derivative of endForceErr while endTorqueVel is the minimum time derivative of eadTorqueErr.

The force sensor control input parameter set includes trForce which is the transform from NOM coordinate frame to the FORCE frame where force control is applied and trSense which is the transform from NOM coordinate frame to the SENSE frame where sensed contact forces are transformed. selVectFc is the selection vector selecting position or force control for each DOF of the FORCE frame. complyVect selects which position controlled DOFs of the FORCE frame are to have compliance, i.e., additional force control.

forceSetpoints provide the force and torque setpoints in the FORCE frame while forceGains provides the force control gains in the FORCE frame. The force sensor control parameter deadZone provides the dead zone filter forces and torques. maxForceVel provides the maximum velocities in the FORCE frame DOFs due to force control.

Force sensor monitor parameters include minForceThres which is the minimum force vector magnitude in the FORCE frame, minTorqueThres which is the minimum torque vector magnitude in the FORCE frame and maxForceThres and maxTorqueThres which are the maximum force and torque vector magnitudes in the FORCE frame, respectively.

Dither sensor control parameters include ditherWave which selects the shape of the dither waveform, trDither is the transform from the NOM coordinate frame to the DITHER frame for the input dither signal. ditherMag is the dither wave magnitude in each DOF of the DITHER coordinate frame while ditherPeriod is the dither wave period in each DOF of the DITHER coordinate frame.

The virtual springs sensor control parameter set includes selVectSp which indicates the DOFs of the NOM frame in which to apply springs, springGains for the position and orientation spring gains to pull the NOM coordinate frame back to the nominal motion trajectory and maxSpringVel which are the maximum velocities due to virtual springs.

There are many input parameters related to teleoperation sensor control. teleMode sets the mode of shared control which may for example be the tool, world or camera mode. trCamera is the transform from the WORLD coordinate frame to the CAMERA coordinate frame. trTeleop is the transform from the NOM coordinate frame to the frame to apply teleoperation inputs. selVectTP is the selection vector to specify DOFs of TELEOP frame to add teleoperation inputs. teleGains is the parameter setting the gains for teleoperation inputs. maxTeleVel sets the maximum velocities due to teleoperation inputs in the TELEOP frame.

Joint sensor control parameters include selVectLim and SelVectSing, the selection vectors selecting which joint limits and singularities to bounce away from. In addition, jsGain provides the force field gain and jsTheta is the distance from joint threshold to initiate joint limiting.

A joint sensor monitor input parameter is provided in the form of jSafetyLimit which sets the safety margins from singularities and joint limits.

Referring now to the block diagram of a preferred embodiment the GCMSF primitive shown in FIG. 3, the overall architecture of the GCMSF primitive will first be described. The control of the various inputs will then be described in greater detail.

The GCMSF primitive provides six sources of robot motion which can all be used individually or simultaneously. These sources of motion have two basic types: nominal motion trajectory generator and sensor based motion.

Positional trajectory generator 102 provides a feedforward Cartesian nominal position $X_d$ of the NOM coordinate frame. This position is combined with data from the various sensors and subsystems, to be described below in greater detail, in summer 104 and then converted in inverse kinematics generator 106 to the appropriate joint angle inputs $\Theta_c$ which are applied to robot manipulator 108. Robot manipulator 108 includes robot arm 80, as shown in FIG. 2, and robot control system 110 which applies control signals to arm 80 and receives joint feedback $\Theta_a$ therefrom.

Figure 3:
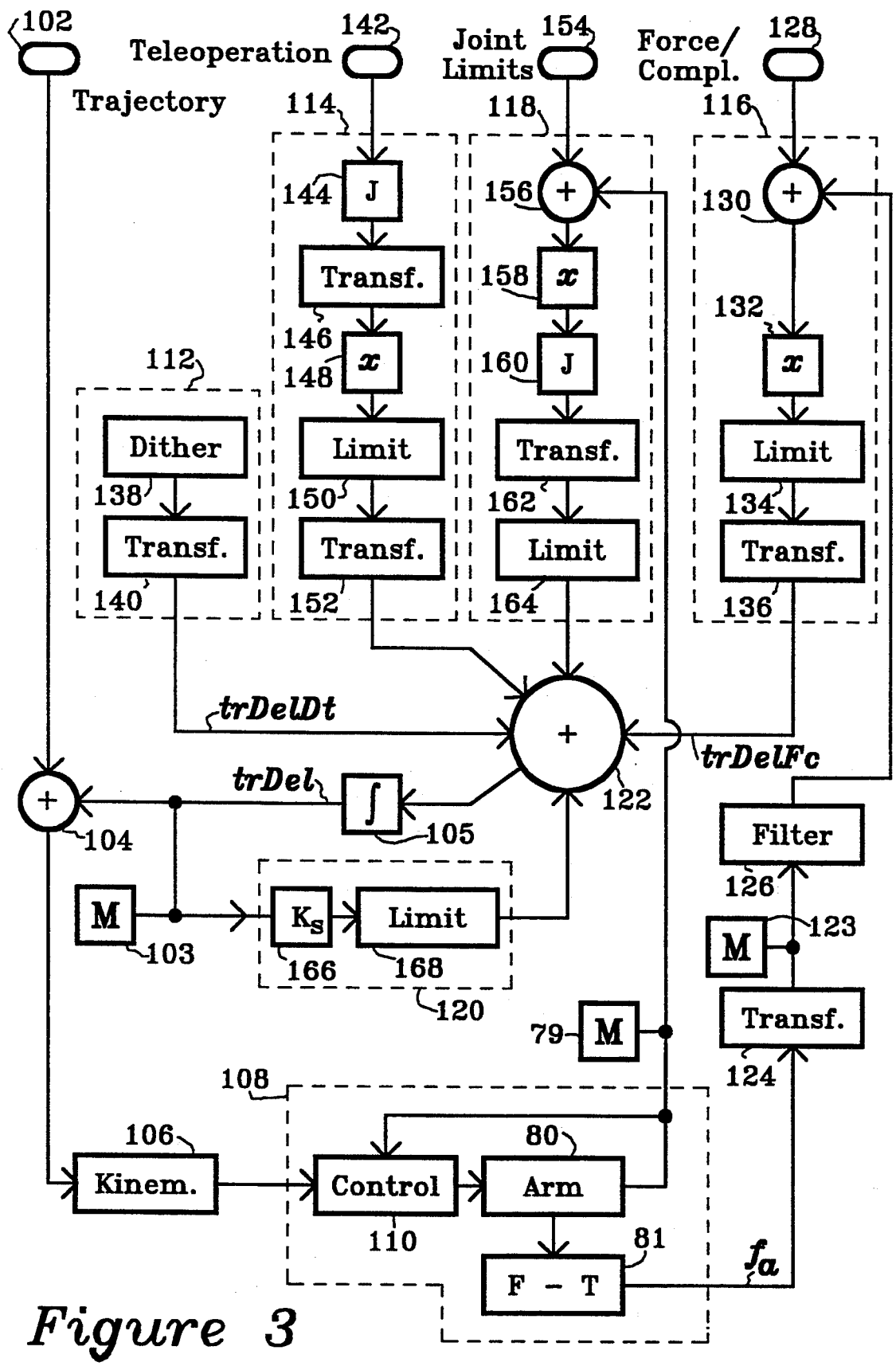
FIG. 3 is a block diagram outline of a general motion primitive in accordance with the present invention.

The particular sensors shown in FIG. 3 include dither function generator 112, teleoperation input 114, force/compliance control subsystem 116, joint limit control 118, and restoration springs subsystem 120. The output data from these sensors are combined in sensor summer 122 and then applied to summer 104 through integrator 105. In this manner, each of the sensors provides a perturbation to the nominal position $X_d$ in the NOM coordinate frame. These perturbations are combined at the current position in the NOM coordinate frame and integrated with past cumulative sensor based motion. Restoration springs subsystem 120 tries to reduce the integrated cumulative sensor based motion.

Sensor summer 122 uses input parameters to determine how to merge inputs from the various motion sources. Sensor summer 122 may be expanded to perform more complex merging of the inputs dependent on system state information or information from other sources either at the local or remote site.

The motion is programmed using the following kinematic ring equation in accordance with techniques well known in this art.

$$trBase \cdot trTn \cdot trNom \cdot trDel \cdot trDrive = trBase \cdot trTnDest \cdot trNom \quad (1)$$

As shown for example in FIG. 2, the WORLD coordinate frame is a fixed coordinate frame. trBase is the constant transform from WORLD coordinate frame to the BASE frame fixed in the fixed first link, base 88, of robot manipulator 108. trTn is the variable transform from BASE to the TN frame fixed with respect to grip tool 78, the terminal link of robot manipulator 108. This transform changes each sample interval during control and is computed based on the results of all other inputs.

trNom is the constant transform from the TN frame to the frame in which Cartesian interpolated motion will occur, that is, the NOM coordinate frame. trDel is the variable transform which includes the integration of all sensor motion. trDrive is the variable transform which provides Cartesian interpolated motion. This transform is initially computed to satisfy the initial conditions of the transforms in the ring equation, equation (1) above, and is interpolated to the identity transform at the end of the nominal motion.

trDest is the constant transform used to specify the nominal destination of the TN frame, that is, the expected value of the trTn at the end of the nominal motion.

Referring now again to FIG. 3, at each sample interval, positional trajectory generator 102 calculates trDrive. The outputs of dither function generator 112, teleoperation input 114, force/compliance control Subsystem 116, joint limit control 118, and restoration springs subsystem 120 are combined in sensor summer 122 to determine trDel from sensor based motion. trTn may then be computed by solving the ring equation, equation (1) above. trTn is applied to inverse kinematics generator 106 to derive $\Theta_c$ which is then applied to robot control system 110 to drive robot arm 80.

Most of these sources of input can specify these inputs in a coordinate frame specific to their functionality; nominal motion is specified in NOM, teleoperation in TELEOP, force-torque control in FORCE, etc. This is useful because these inputs may be most effectively specified in separate frames.

In the example shown in FIG. 2, nominal motion is the motion of about axis 74 of, for example, crank 72. Linear interpolation of a fixed rotation will therefore cause motion in an arc. Force control is provided at knob 76 where grip tool 78 at the terminal link of robot arm 80 grasp crank 72. If, instead, the NOM coordinate frame were also at knob 76, interpolated motion would be in a straight line to the destination, rather than in an arc as it will actually be during the physical turning of crank 72 about axis 74.

In addition, during the teleoperation mode of control, different situations may require that the operator control the motion at knob 76 or at axis 74. If the input motion from the hand controller, such as hand controller 48 shown in FIG. 1, were mapped to motion about axis 74 then only one DOF input will be required from the operator.

There are two major time segments of motion during the execution of the GCMSF primitive: the nominal motion segment and the ending motion segment. When the GCMSF primitive is initiated, it first executes the nominal motion segment with the specified Cartesian interpolated motion and inputs from sensors 112, 114, 116, 118, and 120.

Motion is halted if a monitor event is triggered or when a prescribed Cartesian interpolated motion is completed. If this nominal motion segment completes normally, then the ending motion segment begins. Exactly the same control occurs except that there is no Cartesian interpolated motion because only the sensor based motion is active.

In other words, during the first or nominal motion time segment, positional trajectory generator 102 and sensor summer 122 provide motion control input information to summer 104. Upon successful completion of the Cartesian motion requested by positional trajectory generator 102, the final or ending motion time segment begins in which the only active input to summer 104 is from sensor summer 122.

During the nominal motion segment, termination conditions are not tested. During the ending motion time segment, termination conditions are tested so that motion can be stopped as a result of a monitor event, expiration of a prescribed time period, or the occurrence of a termination condition.

The ending motion time segment is required in order to have a task finish with a known state, known to be satisfying or not satisfying the specified acceptable ending conditions. Further, testing for termination conditions may not be desired until the nominal motion segment is complete.

Control of robot arm 80 may be accomplished with multiple rates of control. For example, the Cartesian level control which includes all control associated with the GCMSF primitive may be run with a 5 ms sample interval while the joint servo control in robot control system 110 may have a different sample interval, such as a 1 ms sample interval.

Now that the general architecture for control in the GCMSF primitive has been described, the control in each individual sensor will be described in greater detail.

Motion control will be discussed first. Positional trajectory generator 102 uses the known RCCL trajectory generator described in detail in a paper by Lloyd et al. entitled "Extending the rccl programming environment to multiple robots and processors" published in *Proc. IEEE Int'l Conf. on Robotics and Automation*, pp 465-474, 1988. Positional trajectory generator 102 generated the trDrive transform which is initially given by the following equation:

$$trDrive = (trTnInit \cdot trNom)^{-1} \cdot trTnDest \cdot trNom \qquad (2)$$

where trTnIait is the initial value of trTn. trDrive is then linearly interpolated from this initial value to the identity transform at the end of the motion. This interpolation is controlled by the input parameters timeVelSel, timeVelVal and accTime. timeVelSel selects whether to finish the motion in a specified time or with a specified velocity. timeVelVal is the time or velocity value to execute the motion in. accTime is the time to ramp up to maximum velocity. If desired, an additional input parameter may be specified to control the maximum acceleration.

Force control, and compliance control, are implemented in the same way and will now be described together. Force control is implemented independently in each DOF of the Cartesian force control frame FORCE. Compliance control is used to describe the use of force-torque control with zero force setpoints in DOFs which are being controlled by another input device, such as positional trajectory generator 102 or a teleoperation input device such as hand controller 48 shown in FIG. 2.

Force control is used to modify the position setpoint in each DOF in order to control the contact forces. This results in damping control with input force error and output position perturbation per sample. The result of force-torque control in each sample interval is the perturbation transform trDelFc.

The first step in achieving force-torque control during a sample interval is the projection of forces and torques, from the force-torque sensor frame to the SENSE frame. Force-torque sensor 81 is a 6 DOF wrist force-torque sensor associated with robot arm 80. Force-torque sensor 81 senses force and torque data in the SENSOR frame centered in force-torque sensor 81. Such force-torque data is then projected to equivalent forces in the TN frame using rigid body force transformations.

The forces on the load, that is, the complete composite body beyond force-torque sensor 81 due to gravity are then computed. The mass and center of mass of the load with respect to the TN frame are given in the massProp input parameter. The current TN frame orientation with respect to the gravity vector is used with the load mass properties to determine the gravity load forces in the TN frame. The resultant forces and torques are those due only to contact and are force-torque sensor output $f_a$.

Force-torque sensor output $f_a$ is in the TN frame and is applied to TN to SENSE transform subsystem 124 to provide sensor output $f_a$ with respect to the SENSE frame. The forces in the SENSE frame are applied through deadzone filter 126 which reduces their magnitude by the values in the input parameter deadZone. If one of the force-torque magnitudes is initially less than the corresponding value in the input parameter deadZone, that value is set to zero. Deadzone filter 126 is useful to reduce drift due to inaccuracies in the determination of the mass properties of the load.

Force control is calculated in the FORCE frame using the forces projected into the SENSE frame. The FORCE and SENSE frames will usually coincide, but there are cases where they may be different, such as the task of leveling a plate on a surface where the SENSE frame is at the center of the plate and the FORCE frame is at the point of contact. In that case, if the SENSE and FORCE frames were both at the point of contact, then no moments would be felt and therefore no rotation due to force-torque control would occur since the force line of action would be through the control frame.

Force setpoint generator 128 provides force setpoints in each DOF of the FORCE frame in accordance with the forceSetpoints input parameter. The selVectFc AND complyVect selection vector input parameters select which of the 6 DOFs of the FORCE frame are to have force and/or compliance control applied. In the selected DOFs, contact forces from deadzone filter 126 are subtracted from the setpoints provided by force setpoint generator 128 in subtractor 130.

The output of subtractor 130 are force errors which are multiplied in force feedback processor 132 by constants provided in the forceGains vector input parameter to produce a differential motion vector of six perturbations in the FORCE frame. The resultant three translations and three rotations are given by the following equation:

$$\vec{d_f} = (d_{fx}, d_{fy}, d_{fz}, \delta_{fx}, \delta_{fy}, \delta_{fz}) \qquad (3)$$

The magnitudes of the elements of the $d_f$ vector are then limited in limiter 134. The maximum magnitudes of the $d_f$ perturbations per sample interval are the velocity limits given in the maxForceVel input parameter multiplied by the sample interval.

The output of limiter 134 is the $FORCE_{trDelFc}$ transform which is a differential translation and rotation transform with elements given by $d_f$ as shown in the following equation:

$$FORCE_{trDelFc} = \begin{bmatrix} 1 & -\delta_{fz} & \delta_{fy} & d_{fx} \\ \delta_{fz} & 1 & -\delta_{fx} & d_{fy} \\ -\delta_{fy} & \delta_{fx} & 1 & d_{fz} \\ 0 & 0 & 0 & 1 \end{bmatrix} \qquad (4)$$

The trDelFc transform is then applied to FORCE to NOM transform subsystem 136 and transformed to the NOM coordinate frame. trDelFc with respect to the FORCE and NOM frame are related by the following equation:

$$^{NOM}trDelFc \cdot trForce = trForce \cdot {}^{FORCE}trDelFc \qquad (5)$$

The trDel transform of equation (1) is then updated in sensor summer 122 with the perturbation due to force-torque control in accordance with the following equation:

$$trDel = {}^{NOM}trDelFc \cdot trDel \qquad (6)$$

Premultiplication is required rather than postmultiplication because the motion is with respect to the NOM coordinate frame.

Dither function generator 112 can be used to provide dither signals to perturb the motion independently in each DOF of the DITHER frame. Dither function generator 112 includes dither wave generator 138 which provides the selected dither waveform, such as a triangular, sinusoidal or square wave, using the magnitude and period of the dither waveforms for each DOF of the DITHER frame given in the ditherMag and ditherPeriod input parameters. As with force-torque control, the inputs in each DOF are elements of a differential translation and rotation transform, trDelDt, which is transformed to the NOM frame by DITHER to NOM transform subsystem 140. The trDel transform is then updated with the perturbation due to the dither waveforms in sensor summer 122 in accordance with the following equation:

$$trDel = {}^{NOM}trDelDt \cdot trDel \tag{7}$$

The operation of teleoperation input 114 will be described next. Teleoperation sensor 142 may conveniently be a 6 DOF hand controller or two 3 DOF joysticks, such as hand controller 48 shown in FIG. 1. In each sample interval the change in joint angles of teleoperation sensor 142 are applied as a vector, $\Delta \Theta_h$, to Jacobian multiplier 144 for multiplication with the appropriate Jacobian in accordance with the teleMode input parameter to get the input Cartesian motion perturbations, $\Delta X_h$.

These motion perturbations are transformed to the TELEOP frame in TELEOP transform subsystem 146. The mode of operation, such as tool mode, or world mode, or camera mode, of teleoperation determines how the perturbations are to be transformed to the TELEOP frame. The trCamera input parameter is used for camera mode teleoperation to specify the present operator viewing orientation. Additional information and details concerning modes of operation are provided in U.S. patent application Ser. No. 07/699,266, filed May 9, 1991, of which this present application is a continuation-in-part.

The teleGains input parameter provides the weightings for the inputs. These weightings are applied in multiplier 148. The input parameter selVectTp selection vector selects which DOFs of teleoperation inputs to include and the maxTelVel input parameter limits the velocity due to teleoperation inputs. These limits and selections are accomplished in limiter 150.

The resultant teleoperation sensor input is transformed from the TELEOP to NOM frame in TELEOP to NOM transform subsystem 152 before application to sensor summer 122. The transform from TELEOP to NOM is given by the trTeleop input parameter.

Joint sensor control is provided by joint limit control 118 which prevents robot arm 80 from going into a joint limit or singularity. The input to joint limit control 118 is $\Theta_a$ which is applied by robot arm 80 as a feedback control signal to robot control system 110.

Joint limits are provided by joint limit generator 154 in the form of $\Theta_{lim}$ and combined with $\Theta_a$ in subtractor 156. The output of subtractor 156 is therefore an indication of the approach of the joint angle to its limit and is equal to the difference between the actual joint angle, $\Theta_a$, and the joint limit value, $\Theta_{lim}$, for each DOF. The output of subtractor 156 is applied as a vector quantity to multiplier 158 to determine the joint angle perturbation in accordance with the following equation:

$$\Delta \theta = \frac{K_\theta}{\Theta_a - \Theta_{lim}} \tag{8}$$

where $K_\theta$ is the gain, $\Theta_a$ is the actual joint angle and $\Theta_{lim}$ is the limit the joint is approaching as a joint limit or as a singularity.

The differential vector output of multiplier 158 is multiplied by the appropriate Jacobian in Jacobian multiplier 160 to get the required Cartesian motion. This Cartesian motion is transformed to the NOM coordinate frame in TN to NOM transform subsystem 162, appropriate limits are applied in limiter 164 and the result is added to trDel in sensor summer 122.

With regard now to restoration springs subsystem 120, virtual restoration springs act on the trDel transform to cause trDel to approach the identity transform. An identity transform is a transform such that when pre-or post-multiplied with a second transform, the result is equal to the second transform.

This reduces the accumulated motion due to sensory inputs and causes the actual motion to approach the nominal motion. Virtual springs are applied in the DOFs specified in the selVectSp input parameter. In the preferred embodiment of the present invention shown in FIG. 3, four virtual springs are used, one along each translational DOF and one orientation spring.

For the translational DOFs, the spring lengths are equal to the displacement vector $\vec{p}$ element of the trDel transform. trDel is a homogeneous transform with column vectors $\hat{n}, \hat{o}, \hat{a}$, and $\vec{p}$. The translation perturbations due to the virtual springs, $\vec{d}_s$, are then the spring lengths multiplied, in multiplier 166, by the translational spring gains in the springGains vector, $\vec{k}_s$, input parameter in accordance with the following equations:

$$d_{sx} = -k_{sx} p_x$$
$$d_{sy} = -k_{sy} p_y$$
$$d_{sz} = -k_{sz} p_z \tag{9}$$

The virtual spring used for orientation is applied about one axis with respect to the NOM frame. The selection of this axis depends upon the number of orientation DOFs specified in the selVectSp input parameter. The axis is $\hat{u}$ and the angular displacement about this axis is $\theta$.

If all orientation DOFs are selected, then $\hat{u}$ is the equivalent axis of rotation of the trDel transform and $\theta$ is the equivalent angle about the axis. If no orientation DOFs are selected, then no orientation perturbation is applied due to virtual springs. If only one orientation DOF is selected, then the corresponding axis $\hat{x}$, $\hat{y}$, or $\hat{z}$ is aligned by the orientation virtual spring.

The vector $\hat{u}$ and $\theta$ are given by the following formulas:

| axis | $\hat{u}$ | $\theta$ |
|---|---|---|
| x | unit $(\hat{n} \times \hat{x})$ | arccos $(\hat{n} \cdot \hat{x})$ |
| y | unit $(\hat{o} \times \hat{y})$ | arccos $(\hat{o} \cdot \hat{y})$ |
| z | unit $(\hat{a} \times \hat{z})$ | arccos $(\hat{a} \cdot \hat{z})$  (10) | where $\hat{x} = (1,0,0)$, $\hat{y} = (0,1,0)$, $\hat{z} = (0,0,1)$. The virtual springs orientation perturbation is then given by the following equality:

$$\delta_{s\theta} = -k_{s\Theta}\Theta \tag{11}$$

where $-k_{s\Theta}$ is the orientation gain in the springGains vector input parameter.

The four virtual springs perturbation magnitudes are then limited, in limiter 168, to the magnitudes given in the maxSpringsVel vector input parameter in as the force-torque control perturbations were limited by the MaxForceVel values. The output of limiter 168 is then applied to sensor summer 122 to update the trDel transform in accordance with the following equation:

$$trDel = trans(\hat{x}, d_{sx}) \cdot trans(\hat{y}, d_{sy}) \cdot trans(\hat{z}, d_{sz}) \cdot rot\text{-}(u, \delta_{s\theta}) \cdot trDel \tag{12}$$

where $trans(\hat{v}, d)$ is a translation of d along the $\hat{v}$ axis and $rot(\hat{v}, \delta)$ is a rotation of $\delta$ about the $\hat{v}$ axis.

Various parameters are continuously monitored during execution. The magnitudes of the translational part of trDel and the equivalent rotation of the orientation part of trDel are compared against the input parameters posThreshold and orientThreshold in fusion monitor subsystem 103. If the values grow larger than the thresholds, then the motion stops.

Also, the vector magnitudes of the contact forces and torques in the SENSE frame are compared against maxForceThres and maxTorqueThres in force monitor 123 and motion stops if one of them is larger than the threshold. If the distance to a joint limit or singularity is less than the angles in the jSafetyLimit input vector as computed in joint monitor 79, then motion stops.

Other separate monitors may be useful, such as a termination condition monitor, which may also be included in the monitors or subsystems shown. A termination condition monitor is used during the end motion time segment. The termination condition monitor may utilize information from all sources of inputs, for example, information available to fusion monitor subsystem 103, force monitor 123 and/or joint monitor 79. The end motion continues until all of the specified termination conditions are satisfied or until the time limit given by the endTime input parameter has passed.

The termination condition monitor is important both because it signals when to stop the motion upon attaining a state as specified by the input parameters, and because it specifies the reason motion was terminated. The cause of termination of the motion is important both as feedback to the local site and when the primitive is used as part of a motion sequence. When the primitive is used in one command in a sequence of commands from the local site, the decision to continue on to the next command of the sequence is dependent on whether the previous motion ended with an acceptable state.

An alternate approach to having the various monitors described above is to have one monitor that checks for both safety and termination conditions. This single monitor would also specify the reason that motion was stopped.

The select input parameter is a bit mask which selects which termination conditions to test for. Any combination of termination conditions can be tested. All termination conditions relate to forces and torques in the SENSE frame or sensor based motion specified by the trDel transform.

Each termination condition is calculated as a moving average of data sampled each 200 ms over a window whose width is provided by the testTime input parameter. Satisfaction of a termination condition means that its magnitude is less than its associated input parameter limit. The endTransErr condition is the magnitude of the trDel transform $\bar{p}$ vector including only the position DOF components. The endAngErr condition is the magnitude of the virtual restoration springs angular displacement, $\Theta$, described above. The endTransVel and endAngVel parameters are the rate of change of the endTransErr and endAngErr conditions, respectively.

The endForceErr and endTorqueErr parameters are the magnitudes of the force and torque error vectors in the SENSE frame including only the force controlled DOFs. The endForceVel and endTorqueVel parameters are the rate of change of the endForceErr and endTorqueErr conditions, respectively.

The preferred embodiment of the generalized motion primitive of the present invention as described above provides fundamental motion modules or subsystems with inputs which describe the desired behavior of the telerobot for each fundamental motion module. The motion modules are arranged, for the purposes of this discussion, into three groups: a priori trajectory generated motion, remote site sensor motion and local site sensor motion.

Remote or local site sensor based motion may be caused by either real or virtual sensors. Real sensors are sensors generating information based on physical data while virtual sensors are sensors which generate information based on imaginary sensors.

The motion modules included in the described embodiment include positional trajectory generation, teleoperation, joint limiting, force/compliance control, restoration springs and dither. Additional motion modules may be provided in accordance with the present invention and would fall into one of the above described three groups of modules.

Each such additional motion module would be provided with an input parameter set which would describe its desired behavior and would provide motion input to sensor summer 122 and/or summer 104.

For example, a collision avoidance subsystem may be implemented similarly to the implementations shown for joint limit generator 154 or force setpoint generator 128. A virtual sensor could be used to provide the distance between objects and, based on those distance, input motions to sensor summer 122 could be generated to avoid collisions.

The position trajectory generator also represents the option of generating trajectories with a hand controller at the local site and providing them as destinations at the remote site. A trajectory generator could then generate a trajectory from the destinations as shown for trajectory generator.

The force setpoints in force/compliance control subsystem 116 are generated as shown from the input parameters but could vary with commands from the local site similar to how teleoperation generates varying setpoint commands from the local site.

Trajectory generator 102 is described as generating a position trajectory in Cartesian space but could also provide setpoints in another space such as joint space where desired robot joint angles would be generated. Similarly, trajectory generator 102 could use joint space rather than Cartesian space and may be merged with summer 104.

An expanded monitoring capability may also be developed in which each motion module may have a monitor associated with it or fewer monitors could be provided which monitor multiple system states. The monitors monitor execution status, system safety, and external event status.

While this invention has been described with reference to its presently preferred embodiment, its scope is not limited thereto. Rather, such scope is only limited insofar as defined by the following set of claims and includes all equivalents thereof.

What is claimed is:

1. A method of operating a telerobot, comprising the steps of:

transferring a set of input parameters from a local control site to a remote execution site including a telerobot, said input parameters specifying desired telerobot trajectory behavior in Cartesian space including behavior based on remote and local site sensor information and desired termination conditions;

retrieving a general motion primitive at the remote site for autonomous, remote site closed loop control of the telerobot to perform a compliant motion task in response to the set of input parameters and to remote and local sensor data;

autonomously generating trajectory motion input at the remote site with the general motion primitive in response to said input parameters specifying desired telerobot trajectory behavior, said trajectory motion input being held constant during an ending motion time segment at a value related to its final value during a nominal motion time segment occurring before the ending motion time segment;

autonomously generating sensor specific remote sensor motion input at the remote site with the general motion primitive for each of a plurality of remote sensors with regard to a coordinate frame specific to that remote sensor in response to a combination of said input parameters related to each of said remote sensors specifying desired telerobot behavior based on remote site sensor information and sensor data originating at the remote site related to each of said remote sensors;

autonomously generating sensor specific local sensor motion input at the remote site with the general motion primitive for each of a plurality of local sensors with regard to a coordinate frame specific to that local sensor in response to a combination of said input parameters related to each of said local sensors specifying desired telerobot behavior based on local site sensor information and sensor data originating at the local site related to each of said local sensors;

autonomously generating sensor specific virtual sensor motion input at the remote site with the general motion primitive for each of a plurality of virtual sensors with regard to a coordinate frame specific to that virtual sensor in response to a combination of said input parameters related to each of said virtual sensors specifying desired telerobot behavior based on virtual sensor information and virtual sensor data related to each of said virtual sensors;

transforming each said sensor specific motion input into a common coordinate frame;

merging all sensor specific motion inputs in said common coordinate frame together to generate a sensor based motion input in said common coordinate frame;

integrating said sensor based motion input with previous sensor based motion input to form a cumulative sensor based motion input;

resolving a kinematic ring equation to specify the Cartesian spatial relationships between the trajectory motion input and the cumulative sensor based motion input at the remote site to generate task level commands in Cartesian space for controlling the motion of the telerobot to perform said compliant motion task;

transforming the task level commands at the remote site to produce joint angle commands to control the motion of the telerobot to perform the compliant motion task;

generating nominal motion monitoring information at the remote site during the nominal motion time segment in response to input parameters, sensor data and the motion of the telerobot to determine if telerobot motion is within predetermined limits during the nominal motion time segment; and generating ending motion monitoring information at the remote site during the ending motion time segment in response to sensor data and the motion of the telerobot to determine when to terminate telerobot motion in accordance with said input parameters specifying desired termination conditions.

* * * * *